INVENTOR:
WILLIAM R. GUIDI
BY Breitenfeld & Levine
ATTORNEYS

INVENTOR:
WILLIAM R. GUIDI

BY Breitenfeld & Levine
ATTORNEYS

United States Patent Office 3,363,466
Patented Jan. 16, 1968

3,363,466
FLUID DETECTION DEVICE
William R. Guidi, Huntington, N.Y., assignor, by mesne assignments, to Aladdin Industries Incorporated, Chicago, Ill., a corporation of Illinois
Filed Aug. 24, 1965, Ser. No. 482,083
1 Claim. (Cl. 73—295)

ABSTRACT OF THE DISCLOSURE

Sensing circuit includes a thermistor probe, reference circuit includes no thermistor, and amplifying transistor located between the circuits. Thermistor maintained non-conducting when out of contact with fluid to be detected, and caused to conduct when contacted by the fluid. A switching means, connected to amplifying transistor, actuated when transistor shifts to conducting state.

---

This invention relates to a device for detecting the presence of a particular fluid at a certain point within an enclosure, and more particularly to such a device employing a thermistor as the sensing element.

Devices of the type to which this invention relates are useful in a variety of environments, an example of which is a level control installation. In such an installation, the sensing element of the device is located within a fluid-containing tank or other enclosure. The sensing element may be above or below the surface of the fluid, and the device is adapted to be actuated when the surface of the fluid reaches the level of the sensing element. Thus, in any particular installation, the device may activate an alarm when the fluid is about to overflow the tank, or when the fluid reaches an undesirably low level. Furthermore, suitable equipment may be associated with the device for automatically removing fluid from the tank when an overflow condition is threatened, or for adding fluid to the tank when the fluid level falls too low.

In the past, it has been suggested that a thermistor might be useful as a sensing element in level control devices, but no really practical device employing a thermistor has until now been devised. Previous devices have employed two thermistors in a bridge arrangement, one thermistor serving as a sensing element and the other serving to establish a reference. Such devices have been less than completely successful because the value of the reference thermistor has a tendency to change, thereby seriously affecting the accuracy of the device.

It is an object of the present invention to provide a device for detecting the presence of a particular fluid at a certain point within an enclosure which employs only one thermistor and which operates with great accuracy over long periods of time.

It is another object of the invention to provide such a device capable of detecting both a liquid-gas interface, such as is present at the surface of a liquid in a tank, and a liquid-liquid interface, such as exists between oil and water in the same tank.

It is a further object of the invention to provide a device which responds very rapidly, by actuating an alarm or performing some other desired function, to detection of an interface by the sensing element.

It is still another object of the invention to provide a probe, for supporting the sensing element within an enclosure capable of withstanding high pressures and extreme variations in temperature.

To accomplish these objectives, the invention provides a sensing circuit including a thermistor, a reference circuit having no thermistor, and an amplifying transistor between the circuits. These circuits are arranged to maintain the transistor in a non-conducting state when the thermistor is out of contact with the fluid to be detected, and to shift the transistor to a conducting state when the fluid contacts the thermistor. A variable resistance means within the reference circuit permits adjustment of the sensitivity of the device. A switching means, such as a transistor, is connected to the amplifying transistor, and is actuated when the amplifying transistor shifts from a non-conducting to a conducting state. Control means, responsive to actuation of the switching means, thereupon actuate an alarm or perform some other function.

Other objects and advantages of the invention will be apparent from the following description in which reference is made to the accompanying drawings.

Figure 1:
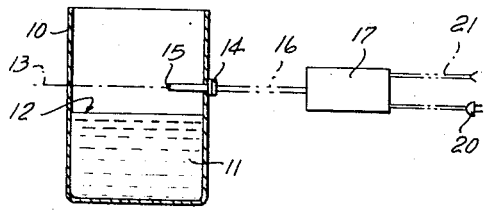
FIG. 1 is a diagram illustrating the way in which the present invention may be associated with a tank containing fluid.

Referring to FIG. 1, a tank 10 is shown containing a fluid 11 having a level 12. The fluid may be either a liquid or flowable granulated solid. Assume that by means not shown, the fluid level in the tank varies, and that it is desired to activate an alarm or perform some other function when the surface of the fluid reaches the level indicated by the dot-dash line 13.

A probe 14, examples of which according to this invention will be described in detail below, is secured to the wall of tank 10 in order to locate a thermistor 15 at the level 13. The thermistor is so positioned within the tank that it will be contacted by the fluid 11 when the fluid level rises to elevation 13. The probe 14 extends through the tank wall, and a cable 16 electrically connects the thermistor 15 to the circuits within a control box 17, which may be located at a remote point from the tank. The circuits within the control box 17 are connected to a source of power by means of a connector 20, and a cable 21 leads from the contacts of a relay within the control box and may be connected to any apparatus which it is desired to actuate when the fluid level contacts the thermistor 15.

Figure 2:
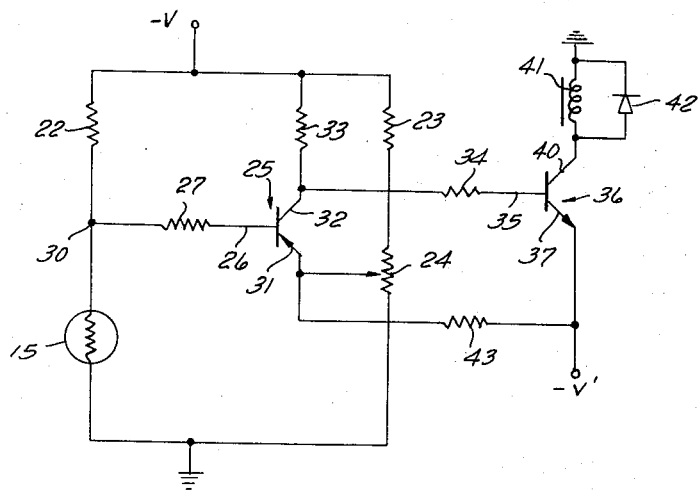
FIG. 2 is a schematic circuit diagram of a device according to this invention, employing a single thermistor probe.

FIG. 2 illustrates the thermistor and the circuits within the control box 17. The thermistor 15 is located within a sensing circuit which also includes a resistor 22. A reference circuit, including a resistor 23 and a potentiometer 24 is arranged in parallel with the sensing circuit. Between the sensing and reference circuits is an amplifying transistor 25. The base 26 of the transistor is connected via a resistor 27 to a junction 30 between the thermistor 15 and resistor 22, and its emitter 31 is connected to the movable contact of the potentiometer 24. The collector 32 of the transistor 25 is connected through a resistor 33 to the voltage source −V, and also through a resistor 34 to the base 35 of a switching transistor 36. The emitter 37 of the transistor 36, which is an NPN type of transistor, is connected to a voltage source −V′, and its collector 40 is connected to the coil 41 of a relay, the relay contacts not being shown. A diode 42 is shunted across the coil 41 for protective purposes. A circuit including a resistor 43 connects the emitter 37 of switching transistor 36 to the emitter 31 of amplifying transistor 25.

Figure 3:
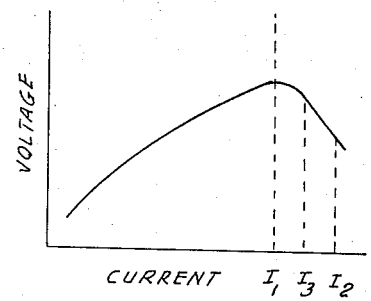
FIG. 3 is a typical thermistor characteristic curve.

In operation, a current from source −V flows constantly through the sensing circuit thereby heating the thermistor 15. Advantageously, for reasons to be mentioned below, the current selected is high enough to cause the thermistor to operate within the "negative resistance" region of its characteristic curve. Thus, referring to FIG. 3 which illustrates a typical thermistor characteristic curve, the current flowing through thermistor 15 should exceed current $I_1$. Assume that under the conditions shown in FIG. 1, wherein the thermistor is in a gas or vapor environment, a current $I_2$ (FIG. 3) flows through the thermistor. The potentiometer 24 has been adjusted so that the emitter 31 of transistor 25 is, under these circumstances, more negative than its base 26. Consequently, the transistor 25 is "off" and no current flows through it. In addition, since there is no current flow to the base 35 of transistor 36, the latter is also in an "off" condition.

Should the level of the fluid 11 within tank 10 rise and contact the thermistor 15, the temperature of the thermistor will drop because the fluid conducts heat from the thermistor faster than does the gaseous environment. As is well known, the resistance of a thermistor varies with its temperature, and when the thermistor is operating within the negative resistance portion of its characteristic curve, its resistance increases as its temperature decreases. Thus, the change in the environment of the thermistor from a gas to the fluid 11 causes the resistance of the thermistor to increase. The current now flowing through the thermistor has decreased from $I_2$ to $I_3$ (FIG. 3) and of course the voltage drop across the thermistor has increased. It follows, therefore, that the junction 30 of the sensing circuit becomes more negative, and hence the base 26 of the transistor 25 becomes more negative than its emitter 31, assuming that the potentiometer was properly adjusted initially. The transistor 25 now switches to a conducting state, i.e. "on," and as a result a current is conducted to the base 35 of the switching transistor 36 whereupon the latter begins conducting, and the relay coil 41 becomes energized. The relay contacts, not shown, are of course capable of activating any type of control means desired, which in turn can perform such functions as energizing a visible or audible alarm, or actuating a pump to remove fluid from tank 10.

When the level of the fluid 11 drops away from the thermistor 15, the temperature of the latter will rise once again, whereupon its resistance will decrease. In consequence, the transistor 25 and hence the transistor 36 will shift to their "off" states, and the relay coil 41 will be deenergized. Rapid response of the transistors and the coil 41 to an increase in temperature of the thermistor is insured by the circuit, including the resistor 43, interconnecting the emitters of the transistors. Furthermore, as a result of the relatively high current flowing through the thermistor, the temperature of the thermistor will be relatively high (of the order of 300 degrees C.). Consequently, the thermistor will be self-cleaning, since it will be hot enough to burn off any of the fluid which may adhere to it. Thus, no barrier to heat transfer will build up on the thermistor and the latter will continue to respond instantaneously to changes in environment throughout the time it is used.

As described above, the present invention is utilized to detect the interface between a liquid or solid and a gas. However, since different liquids conduct heat at different rates, the invention can also be used to detect the interface between two immiscible liquids, such as oil and water. Also, if the thermistor is located within a conduit instead of a tank, the invention can be used to determine whether or not a fluid is flowing in the conduit.

Figure 4:
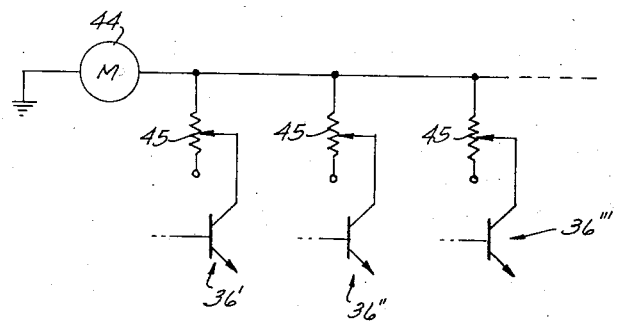
FIG. 4 is schematic diagram of an arrangement for use with a plurality of thermistor sensing elements.
Figure 8:
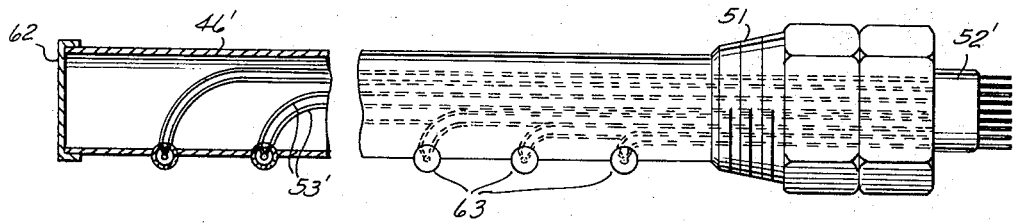

Furthermore, an arrangement according to this invention can be provided for yielding a "continuous" indication of the fluid level within an enclosure. In such a case, a plurality of thermistors are provided, spaced apart in the direction of rise and fall of the fluid level. These thermistors may all be mounted on a single probe, as shown in FIG. 8 which will be referred to again hereinafter. Circuitry as illustrated in FIG. 2 is associated with each of the thermistors, with the exception illustrated in FIG. 4. The transistors 36′, 36″, and 36‴ are comparable to the switching transistor 36 of FIG. 2, and each forms part of the circuitry associated with one of the thermistors. Obviously, as many of these transistors will be present as there are thermistors. The collector of these transistors, instead of being connected to a relay coil, are connected to a meter 44 via resistors 45, the arrangement being such that as each of the transistors 36′–36‴ shifts from its nonconducting to its conducting state, an additional increment of current will be delivered to the meter 44. Thus, the reading on the meter will at any time indicate the number of thermistors in contact with the fluid in the tank and hence the level of the fluid.

Figure 5:
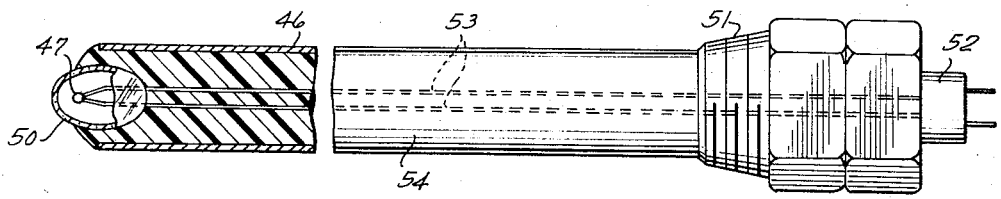
FIGS. 5–8 illustrate various probe constructions for supporting thermistors within enclosures.

Illustrative probe constructions are shown in FIGS. 5–8. In FIG. 5, the probe comprises a rigid tube 46, preferably of stainless steel, having a thermistor 47 partially inserted into one end. As usual, the thermistor is embedded in a glass envelope 50. Mounted on the other end of the tube 46 is an externally threaded connector 51. It is desirable to use a silver solder between the connector 51 and the tube 46 so that the securement between them will not be affected by expansions and contractions of the parts caused by large temperature variations. If an internally threaded hole is provided in the wall of the tank in which the probe is to be mounted, the tube 46 is passed through the hole, and the connector 51 is then screwed into the hole to maintain the probe in the desired location. If desired, a flange can be formed on the end of the tube in place of the connector 51, and the flange secured to the wall of the enclosure.

An electrical connector 52 is mounted behind the threaded connector 51, and a pair of electrical conductors 53 extending inside the tube 46 and along its length connect the thermistor 47 to the connector 52. An epoxy material 54 fills the tube 46 and holds the thermistor in place since the envelope 50 is partially embedded within the epoxy. This probe construction, as well as the others described below, are capable of withstanding temperatures ranging from 60 degrees below zero centigrade to 200° C., and pressures over 3000 pounds per square inch.

Figure 6:
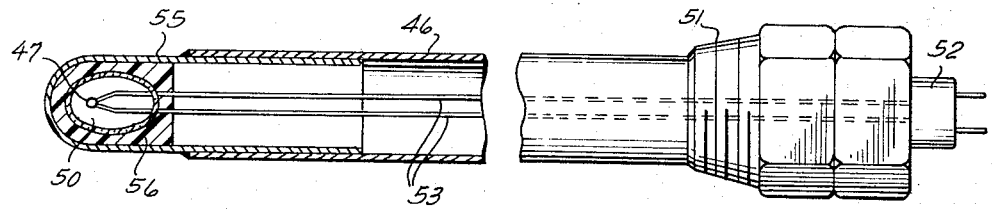

In the probe construction illustrated in FIG. 6, the thermistor 47, envelope 50, tube 46, connectors 51 and 52, and leads 53 are identical to those of FIG. 5 construction. In this case, however, a short tube 55 is mounted in and projects from one end of the tube 46, the exposed end of the short tube 55 being closed. The thermistor 47 is embedded in manganese oxide 56 which fills the closed end portion of the short tube. The short tube 55 serves to protect the thermistor and its glass envelope from damage due to accidental blows. Nevertheless, since manganese oxide is such a good conductor of heat, no operating efficiency is lost.

Figure 7:
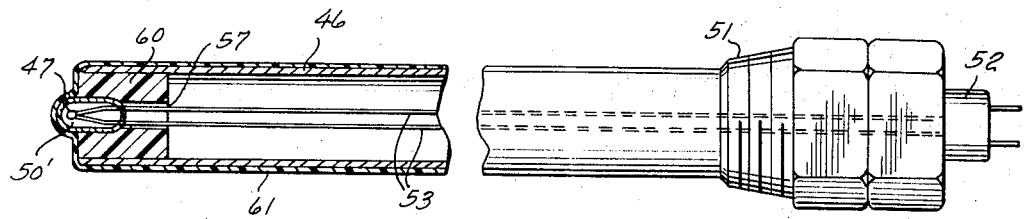

In the probe construction of FIG. 7, the thermistor 47, tube 46, connectors 51 and 52, and leads 53 are identical to those in the two previously-described constructions. The glass envelope 50′ which is somewhat narrower than the envelope described above, is snugly accommodated by a bore 57 located in a plug 60 of Teflon. The Teflon plug is force fitted into the end of the tube 46, and the entire exterior surface of the tube 46, plug 60 and envelope 50′ is provided with a coating 61 of Teflon. This probe construction is particularly useful when acids or other corrosive materials are the fluids being monitored.

The probe construction of FIG. 8 is intended for use with "continuous" systems as described above. The tube 46 is closed at its end opposite the connector 51 by a cap 62, and the tube is provided with a series of holes along its length which accommodate a series of thermistors in their glass envelopes 63. The envelopes 63 may be secured in the holes in any of the ways in which the envelopes 50 and 50′ are mounted, as described above with reference to FIGS. 5–7. A pair of leads 53' connects each thermistor to a connector 52' which is provided with as many terminals as there are leads.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claim.

What is claimed is:

1. A device for detecting the presence of a particular fluid at certain points within an enclosure, comprising a plurality of sensing circuits each having a thermistor, means for locating said thermistors at spaced apart points within the enclosure, a reference circuit for each sensing circuit, an amplifying transistor connected between each pair of reference and sensing circuits, said circuits being arranged to maintain said transistor in a non-conducting state when its respective thermistor is out of contact with the fluid and in conducting state when the fluid contacts said thermistor, a switching means connected to each transistor, each switching means being actuated when its respective transistor shifts from a non-conducting to a conducting state, and a control means arranged to sum the actuations of said switching means and thereby indicate the position of the fluid within the enclosure.

References Cited

UNITED STATES PATENTS

| | | | |
|---|---|---|---|
| 3,038,106 | 6/1962 | Cutsogeorge et al. | |
| 3,111,031 | 11/1963 | Kuritza | 73—304 X |
| 3,139,753 | 7/1964 | Brudner | 73—362 |
| 3,153,769 | 10/1964 | Moses | 73—362 X |
| 3,221,555 | 12/1965 | Biber | 73—362 |

FOREIGN PATENTS 1,178,616  9/1964  Germany.

LOUIS R. PRINCE, *Primary Examiner.*

D. O. WOODIEL, *Assistant Examiner.*